(12) United States Patent
Bilinski et al.

(10) Patent No.: US 8,775,924 B1
(45) Date of Patent: Jul. 8, 2014

(54) PROCESSING WEB PAGES BASED ON CONTENT QUALITY

(75) Inventors: Brandon Bilinski, San Francisco, CA (US); Stephen Kirkham, San Francisco, CA (US)

(73) Assignee: Google Inc., Mountain View, CA (US)

( * ) Notice: Subject to any disclaimer, the term of this patent is extended or adjusted under 35 U.S.C. 154(b) by 172 days.

(21) Appl. No.: 13/417,168

(22) Filed: Mar. 9, 2012

(51) Int. Cl.
*G06F 17/22* (2006.01)

(52) U.S. Cl.
USPC ............ 715/234; 715/205; 715/760; 715/772

(58) Field of Classification Search
USPC ......... 715/201, 203, 205, 234, 273, 760, 202, 715/204, 255, 772
See application file for complete search history.

(56) References Cited

U.S. PATENT DOCUMENTS

| | | | |
|---|---|---|---|
| 6,285,999 B1 | 9/2001 | Page | |
| 8,055,638 B2 * | 11/2011 | Schechter et al. | 707/705 |
| 8,442,984 B1 * | 5/2013 | Pennock et al. | 707/748 |
| 8,447,751 B2 * | 5/2013 | Stouffer et al. | 707/709 |
| 2002/0038350 A1 * | 3/2002 | Lambert et al. | 709/217 |
| 2007/0192246 A1 * | 8/2007 | Futamase | 705/40 |
| 2007/0271238 A1 * | 11/2007 | Webster et al. | 707/3 |
| 2008/0114709 A1 * | 5/2008 | Dixon et al. | 706/13 |
| 2008/0306830 A1 * | 12/2008 | Lasa et al. | 705/26 |
| 2009/0222431 A1 * | 9/2009 | Kumar | 707/5 |
| 2011/0010336 A1 * | 1/2011 | Johnson et al. | 707/609 |
| 2011/0218961 A1 * | 9/2011 | Johnson et al. | 707/609 |

OTHER PUBLICATIONS

"Finding More High-Quality Sites in Search", Google Official Blog; retrieved from <http://googleblog.blogspot.com/2011/02/finding-more-high-quality-sites-in.html> Feb. 24, 2011, 1 pg.
"Google Chrome Blog: New Chrome Extension: Block Sites from Google's Web Search Results"; retrieved from <http://chrome.blogspot.com/2011/02/new-chrome-extension-block-sites-from.html> Feb. 14, 2011, 3 pgs.
"Google Search and Search Engine Spam", Google Official Blog; retrieved from <http://googleblog.blogspot.com/2011/01/google search-and-search-engine-spam.html> Jan. 21, 2011, 2 pgs.

* cited by examiner

*Primary Examiner* — Maikhanh Nguyen
(74) *Attorney, Agent, or Firm* — McDermott Will & Emery LLP

(57) ABSTRACT

Computer-implemented methods of processing web pages based on content quality are provided. In one aspect, a method includes receiving a request for a web page. The method includes determining the content quality of the requested web page based on whether it is a parked web page, a content farm web page, or a link farm web page. The method includes providing for display, based on the content quality of the requested web page, a graphical component providing options to proceed to the requested web page or to an alternate web page relevant to the request for the web page. The method includes receiving an indication of a selection of an option from the graphical component to proceed to the requested web page or to an alternate web page. The method further includes providing, based on the received indication, the requested web page or an alternate web page.

19 Claims, 5 Drawing Sheets

PROCESSING WEB PAGES BASED ON CONTENT QUALITY

BACKGROUND

1. Field

The present disclosure generally relates to processing web pages, and more particularly to processing web pages based on content quality.

2. Description of the Related Art

Users may conduct searches using Internet search engines to find content related to a search query. To that end, users are typically interested in reaching web sites that offer relevant content. However, users often end up reaching low quality websites that do not offer useful content and/or contain advertisements and little else.

SUMMARY

The disclosed subject matter relates to a computer implemented method of processing web pages based on content quality. The method includes receiving a request for a web page. The method further includes determining the content quality of the requested web page based on whether the requested web page is a parked web page, a content farm web page, or a link farm web page. The method further includes providing for display, based on the content quality of the requested web page, a graphical component providing an option to proceed to the requested web page or to proceed to an alternate web page relevant to the request for the web page. The method further includes receiving an indication of a selection of an option from the graphical component to proceed to the requested web page or to proceed to an alternate web page. The method further includes providing, based on the received indication, the requested web page or an alternate web page.

The disclosed subject matter further relates to a system for processing web pages based on content quality. The system includes a memory including instructions for processing web pages based on content quality, and a processor. The processor is configured to receive a request for a web page. The processor is further configured to determine the content quality of the requested web page based on whether the requested web page is a parked web page, a content farm web page, or a link farm web page. The processor is configured to provide for display, based on the content quality of the requested web page, a graphical component providing an option to proceed to the requested web page or to proceed to an alternate web page relevant to the request for the web page. The processor is further configured to receive an indication of a selection of an option from the graphical component to proceed to the requested web page or to proceed to an alternate web page. The processor is further configured to provide based on the received indication, the requested web page or an alternate web page.

The disclosed subject matter further relates to a machine-readable medium including machine-readable instructions for causing a processor to execute a method for processing web pages based on content quality. The method includes receiving a request for a web page. The method further includes determining the content quality of the requested web page based on whether the requested web page is a parked web page, a content farm web page, or a link farm web page. The method further includes providing for display, based on the content quality of the requested web page, a graphical component providing an option to proceed to the requested web page or to proceed to an alternate web page relevant to the request for the web page. The method further includes receiving an indication of a selection of an option from the graphical component to proceed to the requested web page or to proceed to an alternate web page. The method further includes providing, based on the received indication, the requested web page or an alternate web page.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the disclosed aspects. In the drawings:

DETAILED DESCRIPTION

Figure 1:
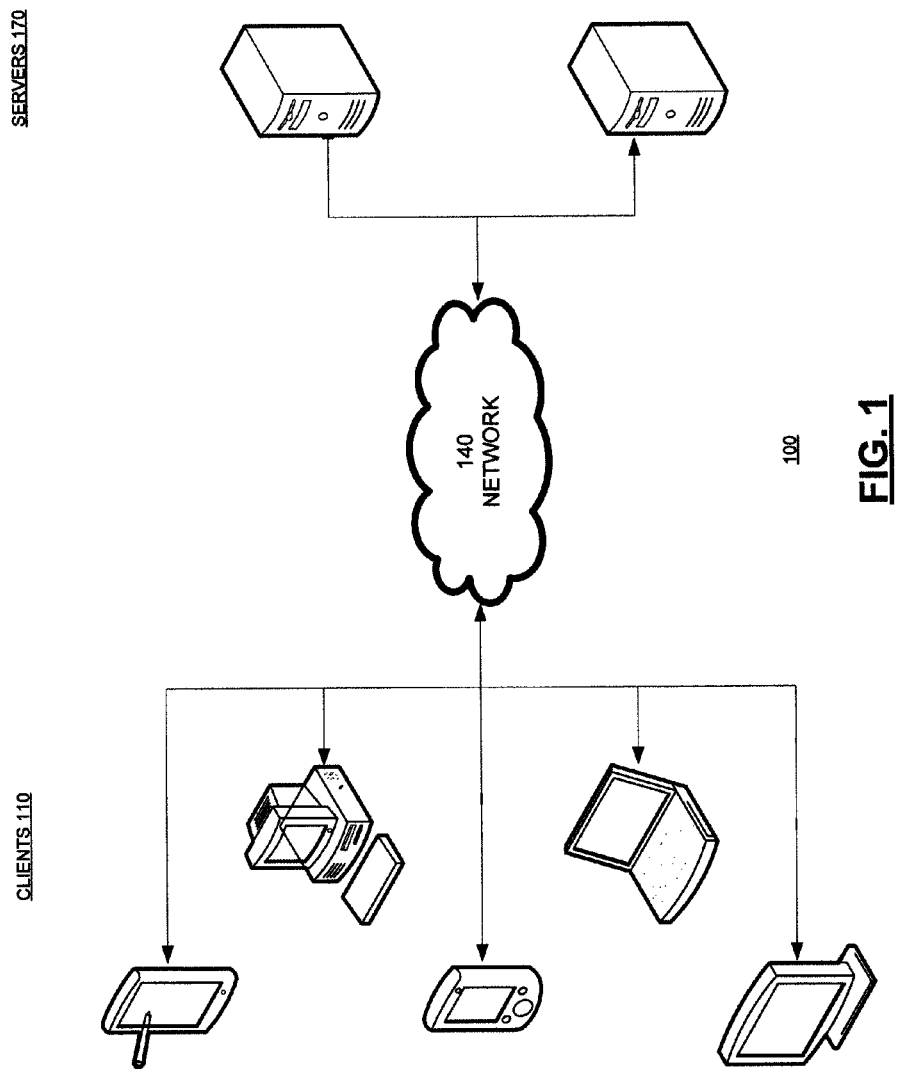
FIG. 1 illustrates an example architecture for processing web pages based on content quality.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology enables processing web pages based on content quality. Once the system is configured, when a request for a web page is received, a graphical component can be provided for display based on the content quality of the requested web page. The graphical component can be a warning prompt, a pop-up, or any approach to provide options to proceed to the requested web page or to proceed to one or more alternate web pages relevant to the request for the web page.

The term "content quality" refers to the value offered by content provided by a web page. Examples of low-quality web pages include parked web pages, content farm web pages, link farm web pages, default pages, pages that do not offer useful content, and/or pages that contain advertisements and little else. As an example of default pages, web pages that are provided when a new web site is created are of a low quality. These default pages can include pages that are provided when a domain name is parked. As an example of web pages that do not offer useful content, web pages that contain nonsensical text that appears to be provided by default or generated randomly, are of low quality.

Parked web pages are often created when a new Internet domain name is registered. Parked web pages do not offer content that is useful or relevant to a user. Content farm web pages contain textual content which is written to maximize page views based on web search engine queries. Link farm web pages are groups of web pages which are interlinked. Web site owners often set up such low-quality web pages to generate advertising revenue. Because advertising revenue correlates directly to the number of visits to a web page, owners of such web sites have an incentive to drive as much traffic to these pages as possible. Therefore, the domain names for such web sites often contain generic terms and/or common misspellings of the domain names of popular websites. The owners of such web sites also employ search engine optimization ("SEO") techniques to direct traffic to such web pages.

For example, a web page is requested. The web page may be requested by a user entering a URL (e.g., www.requested-web-page.com) for the requested web page address directly into the browser, clicking on a link, or using a shortcut. Alternatively, the web page may be requested by another web page, a web application, a native application, an operating system, or an unauthorized program. Examples of unauthorized programs include viruses, trojans, and worms. That is, the request for the web page may be generated with or without the user's interaction, and without or without a user's knowledge or consent. Upon receiving the request for the requested web page, the system may provide for display, a graphical component based on the content quality of the requested web page. That is, if the content quality of the requested web page is below a certain threshold, the system provides for display, options to proceed to the requested web page, and/or proceed to one or more alternate pages (e.g., www.alternate-page-1.com, www.alternate-page-2.com, and so on) relevant to the request for the web page. The alternate web pages may be generated by a search engine.

FIG. 1 illustrates an example architecture for processing web pages based on content quality. The architecture 100 includes clients 110 and servers 170 connected over a network 140.

As illustrated, the clients 110 can be, for example, desktop computers, mobile computers, tablet computers, mobile devices (e.g., a smartphone or PDA), set top boxes (e.g., for a television), video game consoles, or any other devices having appropriate processing capabilities, communications capabilities, and memory. Each client is configured to include a graphical user interface which can be used to display a graphical component.

The clients 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

Figure 2:
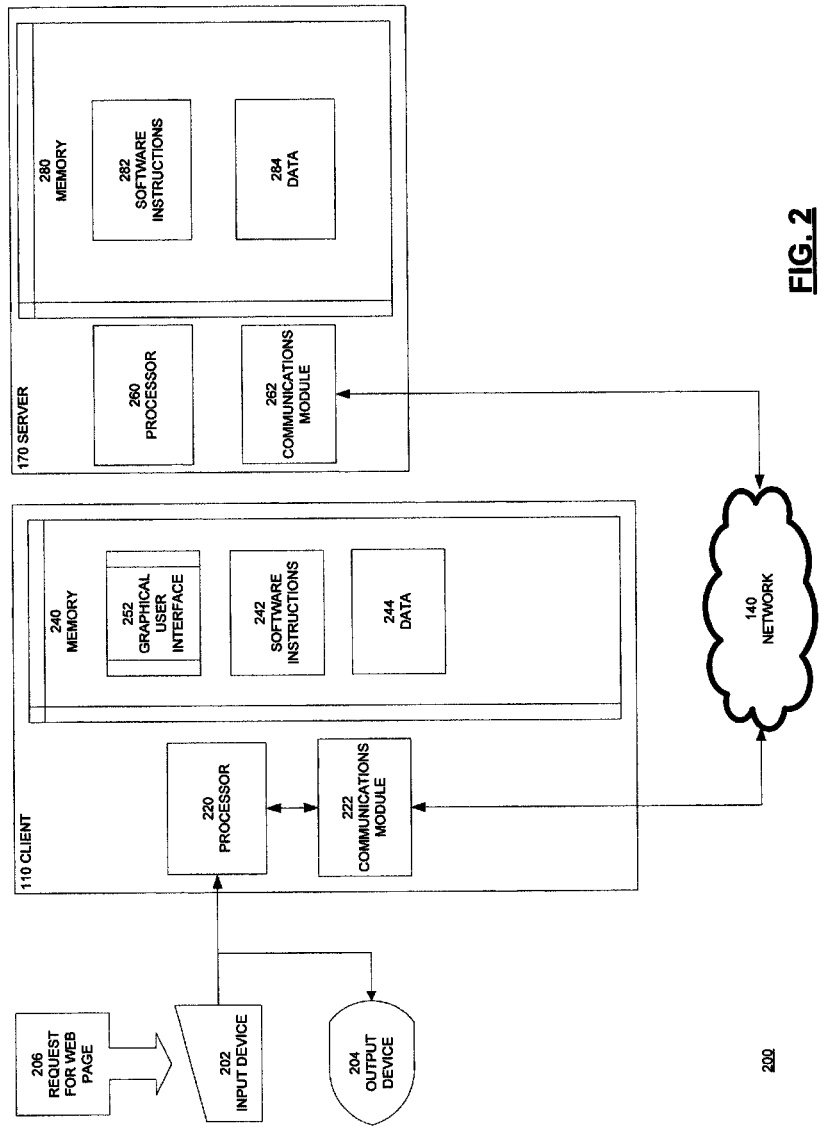
FIG. 2 is a block diagram illustrating an example client and an example server from the architecture of FIG. 1 according to certain aspects of the disclosure.

FIG. 2 is a block diagram 200 illustrating an example client 110 and an example server 170 in the architecture 100 of FIG. 1 according to certain aspects of the disclosure.

The client 110 includes an input device 202, an output device 204, a processor 220, a communications module 222, and memory 240. The input device can be a touchscreen, a keyboard, or any other device to enable a user to supply input to the client 110. The output device 204 can be a display screen. The input can be, for example, a request for a web page 206.

The client 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory 240 includes software instructions 242 and data 244 to enable interaction with the server 170. The memory 240 includes a graphical user interface 252 which allows a user to interact with the client 110, and can be used to display a graphical component to the user.

The server 170 includes a memory 280, a processor 260, and a communications module 262. The memory 280 includes software instructions 282 for storing and/or processing data 284 for processing web pages based on content quality. The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions received from the memory 280, or a combination of both. As an example, the processor 260 of the server 170 executes instructions for processing web pages based on content quality.

The processor 260 is configured to receive from a client device (e.g., 110), a request for a web page (e.g., 206). The processor 260 is configured to determine the content quality of the requested web page based on whether the requested web page is a parked web page, a content farm web page, or a link farm web page. Based on the content quality of the requested web page, the processor is configured to provide for display, a graphical component (e.g., a warning prompt). That is, the processor 260 is configured to provide for display a graphical component (e.g., a warning prompt) if the content quality of the requested web page is at or below a certain threshold. The graphical component provided for display by the processor 260 includes options to proceed to the requested web page or to proceed to one or more alternate web pages relevant to the request for the web page (e.g., 206). The graphical component may also provide an option to stop proceeding to the requested web page. The processor 260 is further configured to receive an indication of a selection of an option from the graphical component to proceed to the requested web page, or to proceed to an alternate web page. The processor 260 is further configured to provide for display, based on the received indication, the requested web page or the alternate web page.

Figure 3:
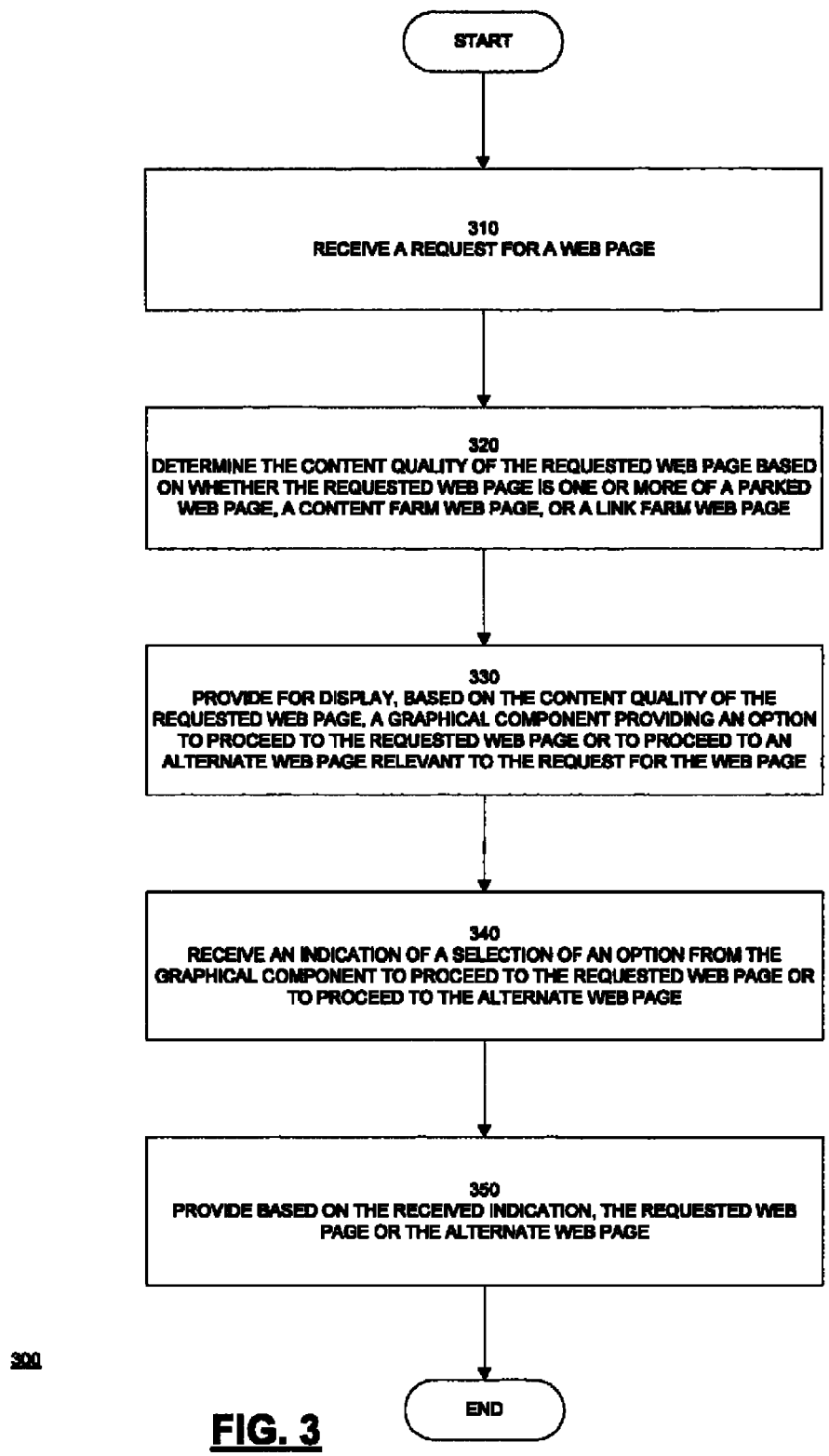
FIG. 3 illustrates an example process for processing web pages based on content quality.

FIG. 3 illustrates an example process 300 for processing web pages based on content quality. In step 310, a request for a web page 206 is received from a client 110. The request for a web page 206 may be generated with or without the user's interaction, knowledge, and/or consent. In step 320, the content quality of the requested web page is determined based on whether the requested web page is a parked web page, a content farm web page, and/or a link farm web page. In step 330, based on the content quality of the requested web page, a graphical component may be provided for display. The graphical component provides options to proceed to the requested web page and/or to proceed to at least one alternate web page relevant to the request for the web page 206. The graphical component may also provide an option to stop proceeding to the requested web page without proceeding to an alternate web page. In step 340, an indication of a selection of an option from the graphical component is received. The indication of the selection may correspond to an option to proceed to the requested web page and/or proceed to at least one alternate web page relevant to the request for the web page 206. Alternatively, the indication of the selection may correspond to an option to stop proceeding to the requested web page without proceeding to an alternate web page. In step 350, based on the received indication, the requested web page or an alternate web page is provided. The process 300 then ends.

Figure 4:
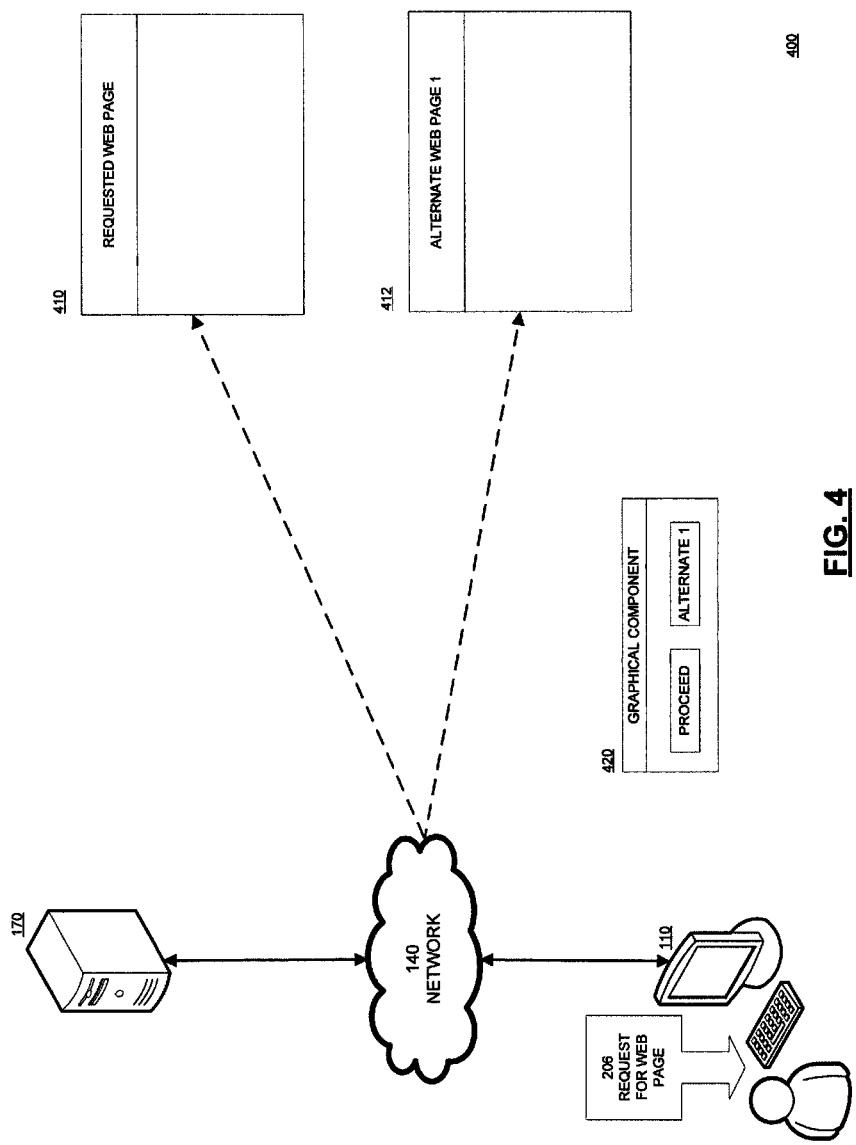
FIG. 4 is an illustration associated with the example process of FIG. 3.

An example will now be described using the example process 300 of FIG. 3. In this example, a desktop computer will be used as the client 110. FIG. 4 is an example illustration 400 depicting a user browsing the Internet. In this example, the user requests a web page 410 by typing a URL into the address bar of a browser running on the desktop computer 110. That is, in this example, the request for a web page 206 is generated by the user.

The process 300 begins when the request for the web page 206 is received by the system. In this example, the request for a web page 206 is generated when the user types the URL www.requested-web-page.com into the address bar of a browser running on the desktop computer 110. In step 310, the request for the web page 206 is received. The request 206 may be received through a variety of approaches. For example, the request 206 may be received by software that is installed on the desktop computer 110. The software may be integrated into the web browser, into the operating system, or may be the browser itself. Examples of software integrated into the web browser include plug ins, add ins, extensions, toolbars, applets, and scriptlets. As another example, the request 206 may be intercepted by software installed on the desktop computer 110.

In step 320, the content quality of the requested web page 410 is determined based on whether the requested web page 410 is a parked web page, a content farm web page, and/or a link farm web page. The content quality of a requested web page 410 may be determined contemporaneously or in advance of the user's request 206. In determining the content quality of the requested web page 410, a database is accessed. The database may be stored as part of the data 284 in the memory 280 on the server 170. The database stores references to web pages together with respective content quality values for web pages. That is, for each reference to a web page in the database, a corresponding content quality value is also stored. This content quality value is accessed and compared to a threshold value to determine the content quality of a web page (e.g., the requested web page 410).

The content quality value is determined by comparing a web page (e.g., the requested web page 410) to patterns found in known low-quality web pages such as parked web pages, content farm web pages, and/or link farm web pages. A blacklist of known low-quality web pages may be generated manually by users and/or automatically based on the detection of the various patterns described below.

The presence or absence of each pattern can have a corresponding effect on the content quality value. That is, for each pattern that is detected within a web page, the content quality value of that web page can be reduced accordingly. The reduction of the content quality value based on the detection of a particular pattern may or may not be the same as a reduction based on the detection of another pattern. That is, each pattern may be weighted differently in the determination of the content quality value.

As an example of a pattern, a low-quality web page may contain one or more references to a known advertising network, web page parking service, and/or a content farm provider. The reference may be in the form of an IP address that the destination hostname resolves to, a Domain Name Server ("DNS server") that the destination domain name is pointing to, an "a href" attribute on the destination page, and/or an "img src" attribute on the destination page.

As an example, a web page that resolves to an IP address known to exclusively serve parked web pages provided by a particular Internet domain registrar, can be deemed a parked web page.

Similarly, a web page with a DNS server known to be associated with web pages that contain little or no content other than advertisements, may likely provide little or no content other than advertising.

As another example, a web page containing hyperlinks with attributes pointing to a known low-quality page, may likely be a low-quality web page. Examples of attributes of hyperlinks include "a href" and "img src" attributes. The "a href" attribute can specify the URL of the page that a hyperlink points to. The "img src" attribute can specify the URL (i.e., source) of an image.

The text of the URL (e.g., the address) of a web page or any references therein may be taken into consideration in the determination of the content quality value of that web page. As an example, a web page with an Internet address (e.g. URL) containing generic terms may likely be a low-quality web page than a web page with an Internet address that does not contain generic terms. As an example, the URL www.virus.com contains the generic term 'virus.' As another example of the text of the URL, a web page containing a common typographical error (e.g., www.intendde-web-page.com) of a bona fide domain name (e.g., www.intended-web-page.com) may likely be a low-quality web page, or a non-existent web page.

The content provided by a web page may be taken into consideration in the determination of the content quality value of that web page. The content may be textual or non-textual. As an example of textual content, a web page including strings (e.g., text strings such as words) associated with low-quality web pages may likely be a low-quality web page. For example, words such as "domain is for sale," "buy this domain," and/or "this page is parked," may be words associated with low-quality web pages.

The amount of content provided by a web page may be taken into consideration in the determination of the content quality of that web page. For example, a web page with little or no content may more likely be a low-quality web page.

The proportion of various types of content provided by a web page may be taken into consideration in the determination of the content quality of that web page. These proportions may be expressed as ratios or percentages. Furthermore, these proportions may be compared to proportions found in web pages that are of a known content quality or content quality value. As an example, a web page providing 99% hyperlinks and 1% plain text is more likely to be a low-quality web page than a web page providing 50% hyperlinks and 50% plain text.

Whether a web site providing the web page is fully functional may be taken into consideration in the determination of the content quality of that web page. The determination of whether a web site is full functional may be based on an HTTP response code, information received from a DNS server (e.g., hostname records), and/or a lack of a response within a certain amount of time. As an example, an HTTP response that is anything other than 200 (e.g., "404 Not Found") would indicate that a web site is not fully functional. As another example, a DNS server that does not return authoritative records for a hostname would indicate that the web site is not fully functional. Similarly, a lack of a response within a certain amount of time, from the IP address of the hostname for a web site would indicate that the web site is not fully functional.

If a reference to the requested web page 410 is not in the database, the content quality of the requested web page 410 is determined based on the content provided within the web page. The determined content quality value is then assigned to the requested web page 410. The determined content quality value of the requested web page 410 is compared to a threshold value to determine the content quality of the requested web page 410. The database is then updated to reference the requested web page 410 and its corresponding content quality value.

The content quality value of a web page may be adapted based on a received indication. For example, an indication of a selection of an option to proceed to the requested web page may cause the content quality value of the requested web page to be increased. Similarly, an indication of a selection of an option to proceed to an alternate web page may cause the content quality value of the requested web page to remain the same or be decreased.

A web page may be suggested for review and/or its content quality value may be adapted based on the amount of time spent on that page. For example, if a user reaches a web page and then leaves immediately, the brief nature of the visit may cause the content quality value of that page to be reviewed and/or reduced. The amount of time spent on a particular web page may be determined through a variety of approaches. For example, web requests for web pages may be used to determine the amount of time spent on a particular web page.

In step 330, a graphical component 420 may be provided for display based on the content quality of the requested web page 410. In this example, the graphical component 420 is a warning which provides an option to proceed to the requested web page 410 or to proceed to an alternate web page 412 relevant to the request for the web page 206.

The graphical component 420 is provided for display based on the comparison of the content quality value of the requested web page 410 to a threshold value. The threshold value against which the content quality value is compared may be configured by the user, by software instructions 282 on the server 170, by software instructions 242 on the client, and/or by other software on the client 110. The threshold value may also be based on feedback received from other users using the system. If the content quality value of the requested web page 410 is equal to or less than the threshold value, the graphical component 420 (e.g., a warning prompt) is provided for display. Conversely, if the content quality value of the requested web page 410 is greater than the threshold value, the graphical component 420 (e.g., a warning prompt) is not provided for display, and the system transmits information to cause the browser to proceed to the requested web page 410. Because a web page can change, the content quality value of a web page is updated periodically. This approach prevents a web page from being permanently being considered to be of low quality.

In step 340, an indication of a selection of an option from the graphical component 420 to proceed to the requested web page 410 or to proceed to an alternate web page 412 is received. If the indication of the selection is not received within a particular duration of time, a timeout occurs. The duration of time corresponding to the timeout may be configured by a user, by software instructions 282 on the server 170, by software instructions 242 on the client 110, and/or by other software on the client 110. The timeout value may also be based on feedback received from other users using the system.

In step 350, based on the received indication, the system provides for display the requested 410 or an alternate web page 412. For example, in response to an indication of a selection to proceed to the requested web page 410, the system provides for display, the web page 410. Similarly, in response to an indication of a selection to proceed to an alternate web page 412, the system provides for display, the alternate web page 412.

If on the other hand, the system receives an indication of a timeout, the system may provide for display a web page deemed most relevant to the user's request 206. The web page deemed most relevant to the user's request 206 may be the same as or different than the alternate web page 412. The relevancy of the web page corresponding to the timeout may be based on feedback received from other users using the system. As an alternative, if the system receives an indication of a timeout, a predefined page may be provided for display. An example of a predefined page may be the start page defined in the user's browser settings. The process 300 then ends.

Figure 5:
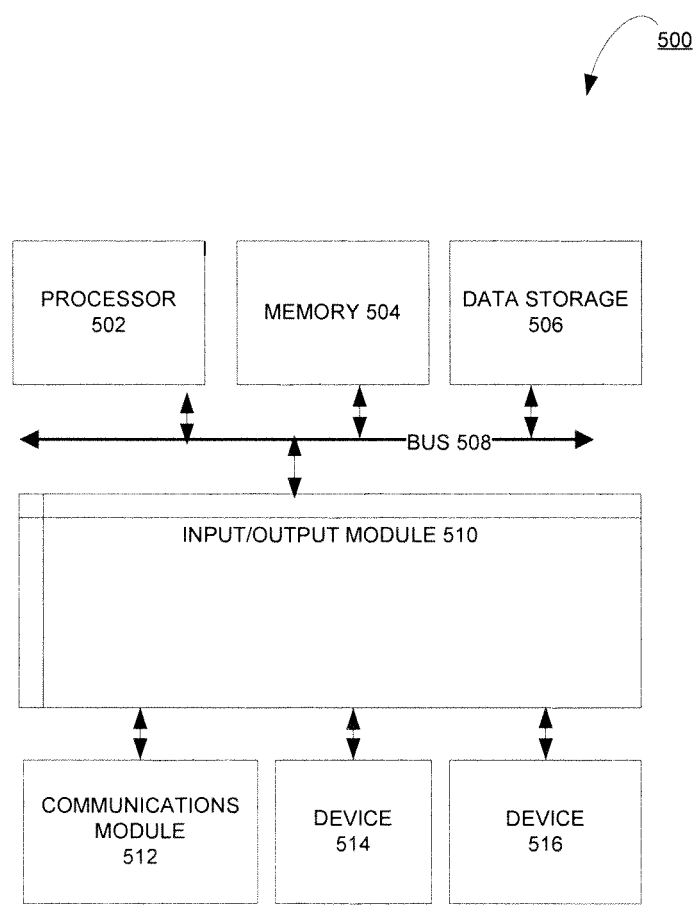
FIG. 5 is a block diagram illustrating an example computer system with which some implementations of the subject technology can be implemented.

FIG. 5 is a block diagram illustrating an example computer system 500 with which the server 170 and/or the client 110 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., the server 170 and/or the client 110) includes a bus 508 or other communication mechanism for communicating information, and a processor 502 (e.g., processor 220 and/or processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240 and or memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Example input/output modules 510 include data ports such as USB ports. The input/output module 510 is configured to connect to a communications module 512. Example communications modules 512 (e.g., communications module 222) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Example output devices 516 include display devices, such as a CRT (cathode ray tube) or LCD (liquid crystal display) monitor, for displaying information to the user.

According to one aspect of the present disclosure, the client 110 and/or the server 170 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and/or servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method of processing web pages based on content quality, the method comprising:
   receiving, by one or more devices, a request for a web page;
   determining, by the one or more devices, the content quality of the requested web page, wherein the content quality of the requested web page is based on whether the requested web page is at least one of a parked web page, a content farm web page, or a link farm web page;
   providing, by the one or more devices, for display, based on the content quality of the requested web page, a graphical component providing an option to proceed to the requested web page or to proceed to at least one alternate web page relevant to the request for the web page;
   receiving, by the one or more devices, an indication of a selection of an option from the graphical component to proceed to the requested web page or to proceed to the at least one alternate web page; and
   providing, by the one or more devices, based on the received indication, the requested web page or the at least one alternate web page,
   wherein the determining the content quality comprises:
      accessing a database storing references to web pages together with respective content quality values for the web pages;
      locating a reference for the requested web page within the database to obtain the respective content quality value; and
      comparing the content quality value to a threshold value, to determine the content quality of the requested web page;
      if a reference for the requested web page is not within the database:
         determining a content quality value of the requested web page based on content provided within the requested web page;
         assigning, to the requested web page, the determined content quality value;
         comparing the determined content quality value of the requested web page to the threshold value, to determine the content quality of the requested web page; and
         updating the database to reference the requested web page and the determined content quality value.

2. The method of claim 1, wherein the graphical component is displayed if the content quality value of the requested web page is equal to or less than the threshold value.

3. The method of claim 1 wherein the graphical component is not displayed if the content quality value of the requested web page is greater than the threshold value.

4. The method of claim 1, wherein the content quality value of the requested web page is based on feedback received from at least one user.

5. The method of claim 1, wherein the content quality value of the requested web page is periodically updated.

6. The method of claim 1, wherein the determination of content quality is based on comparing the requested web page to patterns found in low-quality web pages.

7. The method of claim 6, wherein the patterns found in low-quality web pages include at least one of a layout, text, graphics, links or source code.

8. The method of claim 1, wherein the request for the web page is received by intercepting the request for the web page before it is fulfilled.

9. The method of claim 1, wherein a timeout for receiving the indication occurs if the indication of the selection is not received within a duration of time corresponding to the timeout, and wherein the duration of time corresponding to the timeout is configurable.

10. A system for processing web pages based on content quality, the system comprising:
    a memory comprising instructions for processing web pages based on content quality;
    a processor configured to execute the instructions to:
       receive a request for a web page;
       determine the content quality of the requested web page, wherein the content quality of the requested web page is based on whether the requested web page is at least one of a parked web page, a content farm web page, or a link farm web page;
       provide for display, based on the content quality of the requested web page, a graphical component providing an option to proceed to the requested web page or to proceed to at least one alternate web page relevant to the request for the web page;

receive an indication of a selection of an option from the graphical component to proceed to the requested web page or to proceed to the at least one alternate web page; and provide based on the received indication, the requested web page or the at least one alternate web page, wherein the instructions to determine the content quality comprise:

accessing a database storing references to web pages with respective content quality values for the web pages;

locating a reference for the requested web page within the database to obtain the respective content quality value; and comparing the content quality value to a threshold value, to determine the content quality of the requested web page;

if a reference for the requested web page is not within the database:

determining a content quality value of the requested web page based on content provided within the requested web page;

assigning, to the requested web page, the determined content quality value;

comparing the determined content quality value of the requested web page to the threshold value, to determine the content quality of the requested web page; and updating the database to reference the requested web page and the determined content quality value.

11. The system of claim 10, wherein the graphical component is displayed if the content quality value of the requested web page is equal to or less than the threshold value.

12. The system of claim 10, wherein the graphical component is not displayed if the content quality value of the requested web page is greater than the threshold value.

13. The system of claim 10, wherein the content quality value of the requested web page is based on feedback received from at least one user.

14. The system of claim 10, wherein the content quality value of the requested web page is periodically updated.

15. The system of claim 10, wherein the determination of content quality is based on comparing the requested web page to patterns found in low-quality web pages.

16. The system of claim 15, wherein the patterns found in low-quality web pages include at least one of a layout, text, graphics, links or source code.

17. The system of claim 10, wherein the request for the web page is received by intercepting the request for the web page before it is fulfilled.

18. The system of claim 10, wherein a timeout for receiving the indication occurs if the indication of the selection is not received within a duration of time corresponding to the timeout, and wherein the duration of time corresponding to the timeout is configurable.

19. A non-transitory machine-readable storage medium comprising machine-readable instructions for causing a processor to execute a method of processing web pages based on content quality, the method comprising:

receiving a request for a web page;

determining the content quality of the requested web page, wherein the content quality of the requested web page is based on whether the requested web page is at least one of a parked web page, a content farm web page, or a link farm web page and based on content provided within the requested web page;

assigning to the requested web page a content quality value based on the determined content quality of the requested web page;

comparing the content quality value of the requested web page to a threshold value;

updating a database to reference the requested web page and the content quality value, wherein the database stores references to web pages together with respective content quality values for the web pages;

providing for display, based on the content quality of the requested web page, a graphical component providing an option to proceed to the requested web page or to proceed to at least one alternate web page relevant to the request for the web page;

receiving an indication of a selection of an option from the graphical component to proceed to the requested web page or to proceed to the at least one alternate web page; and providing based on the received indication, the requested web page or the at least one alternate web page;

wherein a timeout for receiving the indication occurs if the indication of the selection is not received within a duration of time corresponding to the timeout, and wherein the duration of time corresponding to the timeout is configurable.

* * * * *